United States Patent
Song (10) Patent No.: US 12,287,054 B2
(45) Date of Patent: Apr. 29, 2025

(54) HOSE CONNECTION JOINT STRUCTURE FOR BATTERY COOLING SYSTEM

(71) Applicant: HYUNDAI MOBIS Co., Ltd., Seoul (KR)

(72) Inventor: Hyuk Geun Song, Cheongju-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 589 days.

(21) Appl. No.: 17/559,356

(22) Filed: Dec. 22, 2021

(65) Prior Publication Data
US 2022/0205566 A1 Jun. 30, 2022

(30) Foreign Application Priority Data
Dec. 24, 2020 (KR) .......... 10-2020-0183878

(51) Int. Cl.
| | |
|---|---|
| *F16L 41/08* | (2006.01) |
| *F16L 5/08* | (2006.01) |
| *H01M 10/613* | (2014.01) |
| *H01M 10/6568* | (2014.01) |

(52) U.S. Cl.
CPC .......... *F16L 41/086* (2013.01); *F16L 5/08* (2013.01); *H01M 10/613* (2015.04); *H01M 10/6568* (2015.04)

(58) Field of Classification Search
CPC .......... F16L 41/001; F16L 41/086; F16L 5/08
See application file for complete search history.

(56) References Cited

U.S. PATENT DOCUMENTS

| | | | | |
|---|---|---|---|---|
| 2014/0300105 A1* | 10/2014 | Kalbacher | ............ | F16L 41/086 |
| 2020/0395644 A1* | 12/2020 | Brauning et al. | ... | H01M 10/625 |
| 2021/0285408 A1* | 9/2021 | Burckel | ............ | F16L 41/086 |
| 2021/0305643 A1* | 9/2021 | Rath | ............ | H01M 10/625 |
| 2023/0112109 A1* | 4/2023 | Yun | ............ | H01M 10/6556 |
| 2023/0170553 A1* | 6/2023 | Yang | ............ | H01M 10/625 |

FOREIGN PATENT DOCUMENTS

CN 210566905 U * 5/2020 ............ F16L 41/086

* cited by examiner

Primary Examiner — Zachary T Dragicevich
(74) Attorney, Agent, or Firm — NSIP Law (57) ABSTRACT

A hose connection joint structure for a battery cooling system of a battery pack including an upper case configured to seal an upper portion of the battery pack, a hose connection part disposed on an upper surface of the upper case and being configured to introduce cooling water from the outside, and a sealing member disposed between the upper case and the hose connection part, wherein the sealing member comprises a bracket in contact with a lower surface of the hose connection part and being configured to block the cooling water from leaking from the lower surface of the hose connection part, and a gasket surrounding the bracket and being in contact with the upper surface of the upper case to block the cooling water from leaking from the upper surface of the upper case.

16 Claims, 6 Drawing Sheets

HOSE CONNECTION JOINT STRUCTURE FOR BATTERY COOLING SYSTEM

CROSS-REFERENCE TO RELATED APPLICATION

This application claims the benefit under 35 USC § 119(a) of Korean Patent Application No. 10-2020-0183878, filed on Dec. 24, 2020 in the Korean Intellectual Property Office, the entire disclosure of which is incorporated herein by reference for all purposes.

BACKGROUND

1. Field

The following description relates to a hose connection joint structure for a battery cooling system, and more specifically, to a hose connection joint structure for a battery cooling system which prevents cooling water from being introduced into a battery pack.

2. Discussion of Related Art

Recently, as an interest in environmental protection increases, instead of internal combustion engine vehicles using conventional combustion engines, development of other type vehicles that are environmentally friendly and fuel-efficient, that is, hybrid vehicles and electric vehicles, is being actively conducted.

Since a hybrid vehicle is driven by two power sources in which a conventional engine and a motor, which is driven by electrical energy, are linked, the hybrid vehicle is positioned as an alternative next-generation vehicle which has been spotlighted recently in the United States, Japan, and Europe due to effects of reducing environmental pollution caused by exhaust gas and improving fuel efficiency.

Generally, in a hybrid vehicle, an engine driven by gasoline and diesel as a main power source and a motor as auxiliary power source are used, and thus the hybrid vehicle travels using the engine as a power source at a predetermined speed or more and travels using the motor as a power source when traveling at a lower speed.

In addition, in an electric vehicle, a motor is mainly used as a main power source.

Meanwhile, a high voltage battery module is used as a power source required to drive a motor, and the high voltage battery module acts as an important factor related to the lifespan of a hybrid vehicle and an electric vehicle.

Accordingly, a battery should be managed thoroughly in order to efficiently operate the battery.

However, when the conventional battery is used for a long time, heat is generated from the battery, and particularly, in the case of a high-capacity battery, when the battery is charged or discharged, since an amount of current increases, more heat is generated.

In this case, when the generated heat is not removed sufficiently, the performance of the battery may be degraded, or furthermore, the battery may catch fire or explode.

Accordingly, the battery should be essentially cooled in order to maintain and improve the performance of the battery.

That is, a battery cooling system is used in an eco-friendly vehicle in order to guarantee the lifespan and performance of a battery installed in the eco-friendly vehicles.

Such a battery cooling system is largely divided into an air cooling type battery cooling system using air, a water cooling type battery cooling system using cooling water, or a refrigerant type battery cooling system using a refrigerant according to a cooling fluid.

Among them, in a water cooling type battery cooling system, a hose connection part through which cooling water moves is installed outside a battery pack in order to prevent the cooling water from being introduced into the battery pack.

In addition, the battery cooling system is formed in a structure in which the hose connection part is coupled to the battery pack by a cooling block nipple.

Specifically, the hose connection part includes a body part, a flange part formed at a center of the body part in a direction perpendicular to the body part, and an insertion groove formed in a lower portion of the flange part.

The hose connection part is installed outside the battery pack, and the flange part of the hose connection part is couped to an upper case of the battery pack by a coupling member.

In addition, a gasket is coupled to a lower surface of the flange part so that the cooling water is blocked from leaking through a space between the upper case of the battery pack and the flange part of the hose connection part.

Meanwhile, the cooling block nipple is coupled to an outer circumferential surface of an insertion part of the hose connection part inserted into the upper case of the battery pack.

In addition, a pair of O-rings are installed to be spaced apart from each other in a vertical direction between the outer circumferential surface of the insertion part and the cooling block nipple.

Accordingly, the cooling water is blocked from leaking through a space between the insertion part and the nipple.

However, in the above-described structure of the water cooling type battery cooling system, the cooling water may leak through a space between the insertion part and the cooling block nipple due to a problem of an insufficient compression degree and the like caused by degradation of durability/damage/an assembly tolerance of the O-ring in contact with the cooling block nipple.

In this case, since a leakage direction of the cooling water is toward an inner portion of the battery pack, the cooling water may be introduced into the battery pack.

In an actual development stage, there was an issue in which the cooling water was introduced into a battery pack due to damage on an O-ring.

Accordingly, when the leaked cooling water is introduced into a battery pack, there are problems in that a short circuit occurs between battery cells and a fire breaks out.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a hose connection joint structure for a battery cooling system of a battery pack, the hose connection joint structure including an upper case configured to seal an upper portion of the battery pack, a hose connection part disposed on an upper surface of the upper case and being configured to introduce cooling water from the outside, and a sealing member disposed between the upper case and the hose connection part, wherein the sealing member comprises a bracket in contact with a lower surface of the hose connection part and being configured to block the cooling water from leaking from the lower surface of the hose connection part, and a gasket surrounding the bracket and being in contact with the upper surface of the upper case to block the cooling water from leaking from the upper surface of the upper case.

The upper case may include a first insertion hole to allow an inner portion and an outer portion of the upper case to communicate with each other and into which the hose connection part is inserted, and a pair of coupling holes formed at both sides of the first insertion hole, and the hose connection part may include a connection body part configured to be inserted into the first insertion hole and formed in a cylindrical shape and in which the cooling water from the outside flows, a flange part formed in a rhombic shape when projected on a plane in a direction perpendicular to the connection body part and in which first through holes may be formed at positions corresponding to the pair of coupling holes, and an insertion part, formed in a cylindrical shape, extending downward from a lower surface of the connection body part and passing through the first insertion hole.

An upper surface of the bracket may be disposed higher than an upper surface of the gasket, and a lower surface of the flange part may be in contact with the upper surface of the bracket.

The bracket may include a bracket body part, a second insertion hole formed in the bracket body part at a position corresponding to the first insertion hole, and second through holes formed in the bracket body part at positions corresponding to the pair of coupling holes and the first through holes.

The gasket may include a gasket body part, an extension part extending upward from a central portion of the gasket and being inserted into the second insertion hole, a third insertion hole formed in the extension part at a position corresponding to the insertion part and in which the insertion part is inserted, third through holes formed in the gasket body part at positions corresponding to the pair of coupling holes, the first through holes, and the second through holes, a first lower protruding part protruding from a lower surface of the gasket body part and being concentric with the third insertion hole, and a second lower protruding part protruding from the lower surface of the gasket body part at a position spaced outward from the first lower protruding part and being concentric with the third insertion hole and the first lower protruding part.

The hose connection joint structure may include a fixing member configured to pass through the coupling hole, the first through hole, the second through hole, and the third through hole to couple the hose connection part to the upper case.

The first lower protruding part may be formed on the lower surface of the gasket body part between the third insertion hole and the third through hole, and the second lower protruding part may be formed on the lower surface of the gasket body part between the third through hole and a circumferential surface of the gasket body part.

The first lower protruding part and the second lower protruding part may be in contact with the upper surface of the upper case.

In another general aspect, there is provided a hose connection joint structure for a battery cooling system of a battery pack, the hose connection joint structure including an upper case configured to seal an upper portion of the battery pack, a hose connection part disposed on an upper surface of the upper case and being configured to introduce cooling water from the outside, a sealing member disposed between the upper case and the hose connection part, and a nipple having one end coupled to a lower end of the hose connection part and the other end coupled to the cooling block and being configured to allow the cooling water introduced from the hose connection part to be introduced into the cooling block.

A pair of O-rings, spaced apart from each other in a vertical direction, may be coupled to an outer circumferential surface of the hose connection part.

The gasket may include a gasket body part, an extension part extending upward from a central portion of the gasket, a third insertion hole formed in the extension part at a position corresponding to the hose connection part and into which the hose connection part is inserted, and a protruding inner circumferential surface part protruding in a band shape along an inner circumferential surface of the third insertion hole.

The O-ring may be in contact with an inner circumferential surface of the nipple, and the protruding inner circumferential surface part may be in contact with an outer circumferential surface of the nipple.

In another general aspect, there is provided a hose connection joint structure for a battery cooling system of a battery pack, the hose connection joint structure including an upper case comprising a first insertion hole configured to allow an inner portion and an outer portion of the upper case to communicate with each other and a pair of coupling holes formed at both sides of the first insertion hole to seal an upper portion of the battery pack, a hose connection part is disposed on an upper surface of the upper case and being configured to introduce cooling water from the outside, a sealing member disposed between the upper case and the hose connection part, and a fixing member configured to fix the hose connection part to the upper case.

The hose connection part may include a connection body part inserted into the first insertion hole and formed in a cylindrical shape and in which the cooling water from the outside flows, and a flange part formed in a rhombic shape when projected on a plane in a direction perpendicular to the connection body part and in which first through holes may be formed at positions corresponding to the pair of coupling holes, and the fixing member may include an assembly bolt that passes through the first through hole and may be hooked on the flange part, and a coupling part fixed to the coupling hole and coupled to the assembly bolt in a screw-coupling manner.

The hose connection part and the coupling part may move towards each other, in response to the fixing member being tightened.

The assembly bolt may include a head part having a lower surface hooked on an upper surface of the flange part, and a screw part extending from the head part in a direction toward the coupling part and being coupled to the coupling part.

The coupling part may include a fixing part fixed to the coupling hole, and a coupling groove extending downward from the fixing part and being formed in a cylindrical shape and having an inner circumferential surface coupled to the screw part.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Figure 1:
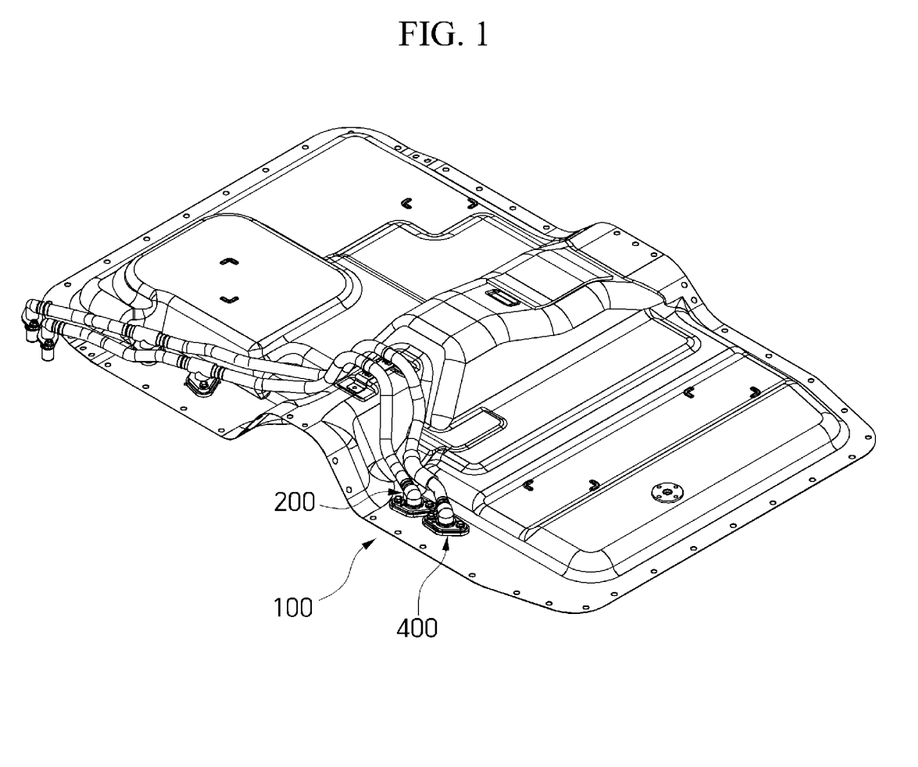
FIG. 1 is a perspective view illustrating an example in which an upper case and a hose connection part for a battery cooling system are coupled.
Figure 2:
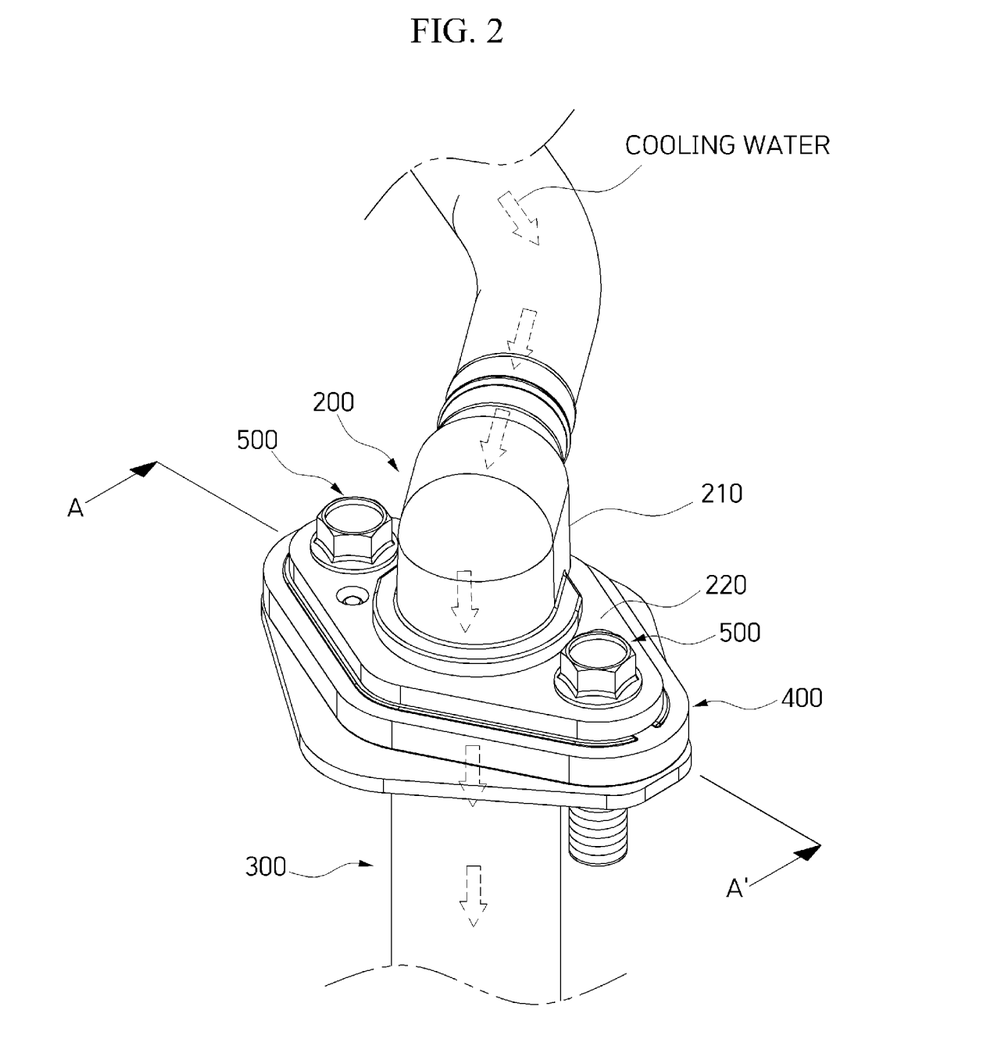
FIG. 2 is an example of a perspective view illustrating the hose connection part for a battery cooling system.
Figure 3:
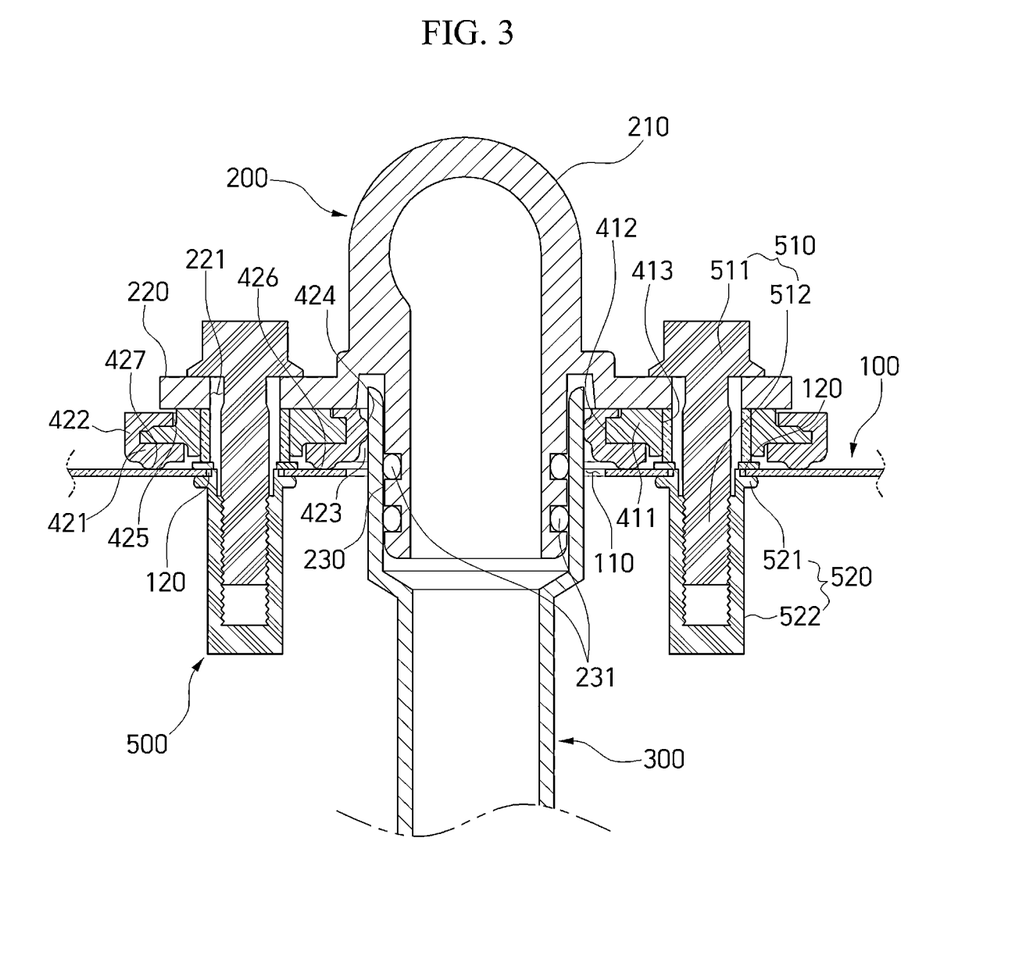
FIG. 3 is an example of a cross-sectional view taken along line A-A' illustrated in FIG. 2.

FIG. 1 is a perspective view illustrating a state in which an upper case and a hose connection part for a battery cooling system according to one embodiment of the present invention are coupled, FIG. 2 is a perspective view illustrating the hose connection part for a battery cooling system according to one embodiment of the present invention, FIG. 3 is a cross-sectional view taken along line A-A' illustrated in FIG. 2.

Referring to FIGS. 1 to 3, a joint structure of a hose connection part 200 for a battery cooling system according to one embodiment of the present invention, through which cooling water is introduced into cooling blocks inserted into a plurality of battery packs to cool heat of the battery packs, includes an upper case 100 which seals an upper portion of the battery pack, the hose connection part 200 coupled to the upper case 100, a nipple 300 inserted into the upper case 100 and coupled to the hose connection part 200, a sealing member 400 which blocks the cooling water from leaking through a space between the upper case 100 and the hose connection part 200, and fixing members 500 which fix the hose connection part 200 to the upper case 100.

The upper case 100 is a case which seals the upper portion of the battery pack and constitutes a housing in which various components such as, the battery pack and the cooling block which cools heat of the battery pack, are accommodated.

The upper case 100 includes a first insertion hole 110 into which the hose connection part 200 is inserted and a coupling hole 120 through which the fixing member 500 passes.

The first insertion hole 110 is a hole which allows an inner portion and an outer portion of the upper case 100 to communicate with each other and into which the hose connection part 200 is inserted in one direction and the nipple 300 is inserted in the other direction.

The coupling hole 120 is formed as a pair of coupling holes 120, and the pair of coupling holes 120 are formed at both sides of the first insertion hole 110.

The hose connection part 200 is a part disposed on the upper case 100, and the cooling water is introduced through the hose connection part 200.

Specifically, one end of the hose connection part 200 is fixed to the upper case 100 and connected to the cooling block, and the other end thereof is connected to a hose through which the cooling water is introduced.

Accordingly, the hose connection part 200 may allow the cooling water to be easily introduced into the cooling block through the hose through which the cooling water is introduced.

The hose connection part 200 includes a connection body part 210 constituting a body thereof, a flange part 220 which extends from the connection body part 210 in a perpendicular direction and is in contact with the upper case 100, and an insertion part 230 inserted into the first insertion hole 110 of the upper case 100.

The connection body part 210 is a part constituting the body of the hose connection part 200 and is disposed on the upper case 100 at a position corresponding to the first insertion hole 110.

In addition, the connection body part 210 is formed in a cylindrical shape, and the cooling water introduced from the outside flows therein.

In addition, one end and the other end of the connection body part 210 are open and any one of one end and the other end is connected to the hose, and the cooling water is introduced into the connection body part 210 from the hose.

Accordingly, the connection body part 210 may allow the cooling water introduced from the hose to be easily introduced into the cooling block.

The flange part 220 is formed in a rhombic shape when projected on a plane, that is, when viewed from above, and is formed on a lower portion of the connection body part 210 in a direction perpendicular to the connection body part 210.

In addition, a first through hole 221 is formed in the flange part 220 at a position corresponding to the coupling hole 120.

That is, the first through hole 221 is formed as a pair of through holes 221, and the pair of through holes 221 are formed at both sides around a center of the flange part 220.

In addition, after the hose connection part 200 is seated on the upper case 100, the fixing member 500 passes through the first through hole 221.

Accordingly, the hose connection part 200 may be firmly fixed to the upper case 100 by the fixing member 500 passing through the first through hole 221.

The insertion part 230 is a part formed in a cylindrical shape and extends downward from a lower surface of the connection body part 210.

In addition, the insertion part 230 passes through the first insertion hole 110 and extends to the inner portion of the upper case 100.

The insertion part 230 is an inner diameter which are the same as those of the connection body part 210 and communicates with an inner portion of the connection body part 210.

Accordingly, the cooling water introduced from the connection body part 210 may be easily introduced into the cooling block through the insertion part 230.

Meanwhile, an O-ring 231 and the nipple 300 are coupled to an outer circumferential surface of the insertion part 230.

The O-ring 231 is formed as a pair of O-rings 231, and the pair of O-rings 231 are disposed on the hose connection part 200, that is, the outer circumferential surface of the insertion part 230, to be spaced apart from each other by a distance in a vertical direction.

In addition, one end of the nipple 300 is coupled to a lower end of the hose connection part 200, that is, the insertion part 230, and the other end thereof is coupled to the cooling block.

The nipple 300 allows the cooling water introduced from the outside through the hose connection part 200 to be easily introduced into the cooling block.

Particularly, when one end of the nipple 300 is coupled to the insertion part 230, the O-ring 231 is disposed between the outer circumferential surface of the insertion part 230 and an inner circumferential surface of the nipple 300.

Accordingly, the O-ring 231 may effectively block the cooling water from leaking through a space between the insertion part 230 of the hose connection part 200 and the nipple 300 coupled to the hose connection part 200.

The sealing member 400 is disposed between the upper case 100 and the hose connection part 200, specifically, between an upper surface of the upper case 100 and the flange part 220.

The sealing member 400 includes a bracket 410 of which an upper surface is in contact with an upper surface of the hose connection part 200 and a gasket 420 in which the bracket 410 is accommodated and of which a lower surface is in contact with the upper surface of the upper case 100.

The bracket 410 is in contact with a lower surface of the hose connection part 200 to block the cooling water from leaking from the lower surface of the hose connection part 200.

In addition, the bracket 410 is a part formed substantially in a shape corresponding to the flange part 220 and is formed in a rhombic shape when projected on a plane, that is, when viewed from above.

The bracket 410 includes a bracket body part 411 constituting a body thereof, a second insertion hole 412 into which the insertion part 230 of the hose connection part 200 is inserted, and a second through hole 413 through which the fixing member 500 passes.

The bracket body part 411 is a part constituting the body of the bracket 410 and is formed in a rhombic shape corresponding to the flange part 220 when projected on a plane, that is, when viewed from above.

The second insertion hole 412 is formed in the bracket body part 411 at a position corresponding to the first insertion hole 110 of the upper case 100 and may be concentric with the first insertion hole 110.

In addition, an extension part 422 of the gasket 420 passes through the second insertion hole 412.

The second through hole 413 is formed as a pair of second through holes 413, and the pair of second through holes 413 are formed in the bracket body part 411 at positions corresponding to the coupling holes 120 and the first through holes 221 and may be concentric with the coupling holes 120 and the first through holes 221.

In addition, the fixing member 500 passing through the coupling hole 120 of the upper case 100 passes through the second through hole 413.

Meanwhile, a bush may be disposed between the second through hole 413 and the fixing member 500.

Accordingly, the bush may effectively prevent an inner circumferential surface of the second through hole 413 from being damaged in a process in which the fixing member 500 passes through the second through hole 413.

In addition, the bush may guide a movement direction of the fixing member 500 so that the fixing member 500 is not shaken when the fixing member 500 passes through the second through hole 413.

The gasket 420 is a part which accommodates the bracket 410 therein, surrounds the bracket 410, is in contact with the upper surface of the upper case 100, and may be formed of an elastic material.

That is, the gasket 420 blocks the cooling water leaking through a space between the hose connection part 200 and the nipple 300 from leaking from the upper surface of the upper case 100.

The gasket 420 includes a gasket body part 421 constituting a body thereof, the extension part 422 inserted into the second insertion hole 412, a third insertion hole 423 which is formed in the extension part 422 and into which the insertion part 230 of the hose connection part 200 is inserted, a third through hole 425 through which the fixing member 500 passes, and a first lower protruding part 426 and a second lower protruding part 427 of which lower portions are in contact with the upper case 100.

The gasket body part 421 is a part constituting the body of the gasket 420 and is formed in a rhombic shape, which corresponds to the flange part 220 and the bracket body part 411, when projected on a plane, that is, when viewed from above.

The extension part 422 is a part extending upward from a central portion of the gasket 420 and, specifically, extends upward from the gasket body part 421 along an inner circumferential surface of the second insertion hole 412.

In addition, the extension part 422 is formed in a cylindrical shape, and the third insertion hole 423, into which the insertion part 230 of the hose connection part 200 is inserted, is formed in the extension part 422.

Meanwhile, the upper surface of the bracket 410 is formed at a higher level than an upper surface of the gasket 420, that is, an upper surface of the extension part 422.

Accordingly, the upper surface of the bracket 410 is in contact with a lower surface of the flange part 220.

Accordingly, the bracket 410 may effectively block the cooling water leaking through the space between the hose connection part 200 and the nipple 300 from additionally leaking through a space between the flange part 220 and the upper case 100.

The third insertion hole 423 is formed in the extension part 422 at a position corresponding to the first insertion hole 110 of the upper case 100 and the insertion part 230 of the hose connection part 200, and may be concentric with the first insertion hole 110 and the insertion part 230.

In addition, the insertion part 230 is inserted into the third insertion hole 423 in one direction, and the nipple 300 is inserted into the third insertion hole 423 in the other direction.

A protruding inner circumferential surface part 424 is formed on an inner circumferential surface of the third insertion hole 423.

The protruding inner circumferential surface part 424 is a part protruding in a band shape along the inner circumferential surface of the third insertion hole 423 and is in contact with an outer circumferential surface of one end of the nipple 300 inserted into the third insertion hole 423.

That is, the O-ring 231 is in contact with the inner circumferential surface of the nipple 300, and the protruding inner circumferential surface part 424 is in contact with an outer circumferential surface of the nipple 300.

Accordingly, the protruding inner circumferential surface part 424 may effectively block the cooling water from leaking through a space between the nipple 300 and the sealing member 400.

Accordingly, even when the cooling water leaks through the space between the insertion part 230 of the hose connection part 200 and the nipple 300 coupled to the hose connection part 200, the protruding inner circumferential surface part 424 may effectively block the cooling water from leaking through a space between the outer circumferential surface of the nipple 300 and the third insertion hole 423.

The third through hole 425 is formed as a pair of third through holes 425, and the pair of third through holes 425 are formed in the gasket body parts 421 at positions corresponding to the coupling holes 120, the first through holes 221, and the second through holes 413 and may be concentric with the coupling holes 120, the first through holes 221, and the second through holes 413.

In addition, after the hose connection part 200 is seated on the upper case 100, the fixing member 500 passes through the third through hole 425.

Accordingly, in the joint structure of the hose connection part 200 formed in the above-described structure of the present invention, the sealing member 400 including the bracket 410 and the gasket 420 is disposed between the upper surface of the upper case 100 and the lower surface of the flange part 220.

Meanwhile, the fixing member 500 passes through the first through hole 221, the second through hole 413, and the third through hole 425, and the hose connection part 200 is fixed to the upper case 100 by the fixing member 500.

That is, the bush inserted into the first through hole 221 and the second through hole 413 guides a through direction of the fixing member 500.

Accordingly, when the fixing member 500 passes through the first through hole 221, the second through hole 413, and the third through hole 425, a movement direction of the fixing member 500 may be guided by the first through hole 221 and the bush so that the fixing member 500 is not shaken.

The fixing member 500 includes an assembly bolt 510 and a coupling part 520.

The assembly bolt 510 passes through the first through hole 221 and is hooked on an upper surface of the flange part 220.

The assembly bolt 510 includes a head part 511 and a screw part 512.

The head part 511 is disposed in a region, which corresponds to the first through hole 221, on the upper surface of the flange part 220, and a lower surface of the head part 511 is hooked on the upper surface of the flange part 220, that is, a surrounding region of the first through hole 221.

In addition, when the assembly bolt 510 is coupled to the upper case 100, a separate tool is fitted to an upper portion and a circumference of the head part 511.

The screw part 512 is a part extending from the head part 511 in a direction toward the coupling part 520 and is coupled to the coupling part 520 in a screw-coupling manner.

Accordingly, a thread is formed on an outer circumferential surface of the screw part 512 to be coupled to the coupling part 520 in the screw-coupling manner.

Meanwhile, an outer diameter of the head part 511 is greater than an outer diameter of the screw part 512.

Accordingly, the lower surface of the head part 511 may be effectively hooked on the surrounding region of the first through hole 221.

One end of the coupling part 520 is open, and the other end thereof is formed as a closed cylindrical shape.

One end of the coupling part 520 is fixed to the coupling hole 120 of the upper case 100, and the assembly bolt 510 is inserted into a cylindrical inner portion of the coupling part 520 so that the coupling part 520 and the assembly bolt 510 are coupled in the screw-coupling manner.

The coupling part 520 includes a fixing part 521 and a coupling groove 522.

The fixing part 521 is coupled to an inner circumferential surface of the coupling hole 120 to fix the coupling part 520 to the upper case 100.

The fixing part 521 may be coupled to the inner circumferential surface of the coupling hole 120 in an insertion manner.

The coupling groove 522 extends downward from the fixing part 521 and is formed in a cylindrical shape, and the screw part 512 is coupled to an inner circumferential surface of the coupling groove 522.

That is, a tread corresponding to the screw part 512 is formed on an inner circumferential surface of the coupling groove 522 formed in a cylindrical shape.

In the joint structure of the hose connection part 200 of the present invention formed in the above-described structure, the flange part 220 supported by the head part 511 of the fixing member 500 is pressed downward when the fixing member 500 coupled to the coupling groove 522 is tightened, and accordingly, the flange part 220 presses the sealing member 400 downward.

In addition, the coupling part 520 coupled to the screw part 512 of the fixing member 500 in the screw-coupling manner is pressed upward, and accordingly, the upper case 100 fixed to the fixing part 521 of the coupling part 520 is pressed upward.

That is, the hose connection part 200 and the coupling part 520 are moved in facing directions when the fixing member 500 is tightened, and thus, the sealing member 400 disposed between the hose connection part 200 and the upper case 100 may be effectively compressed by the hose connection part 200 and the upper case 100.

The first lower protruding part 426 protrudes from a lower surface of the gasket body part 421 and is concentric with the third insertion hole.

Specifically, the first lower protruding part 426 protrudes from the lower surface of the gasket body part 421 in a circular band shape between the third insertion hole 423 and the third through hole 425.

The second lower protruding part 427 protrudes from the lower surface of the gasket body part 421 at a position spaced outward from the first lower protruding part 426 and is concentric with the third insertion hole 423 and the first lower protruding part 426.

Specifically, the second lower protruding part 427 protrudes from the gasket body part 421 in a circular band shape between the third through hole 425 and a circumferential surface of the gasket body part 421.

That is, the third through hole 425 is formed between the first lower protruding part 426 and the second lower protruding part 427.

Accordingly, the first lower protruding part 426 and the second lower protruding part 427 are in contact with the upper surface of the upper case 100.

In addition, when the assembly bolt 510 is tightened so that the hose connection part 200 and the upper case 100 are moved in facing directions, the sealing member 400 disposed between the hose connection part 200 and the upper case 100 is compressed by the hose connection part 200 and the upper case 100, and thus, a space between the sealing member 400 and the upper case 100 may be more effectively sealed by the first lower protruding part 426 and the second lower protruding part 427.

Accordingly, even when the cooling water leaks through the space between the insertion part 230 of the hose connection part 200 and the nipple 300, since the space between the sealing member 400 and the upper case 100 is sealed by the first lower protruding part 426 and the second lower protruding part 427 of the sealing member 400, the cooling water may be effectively blocked from leaking to the outside of the hose connection part 200.

Accordingly, since the cooling water is blocked from being introduced into the battery pack, a short circuit and fire between the battery cells may be prevented.

Particularly, the gasket 420, the protruding inner circumferential surface part 424, the first lower protruding part 426, and the second lower protruding part 427 are formed as one part.

Accordingly, the joint structure of the hose connection part 200 of the present invention may allow an assembly process, which is for blocking the cooling water from being introduced into the battery pack, to be simplified.

Hereinafter, the assembly process of the hose connection joint structure for a battery cooling system according to the embodiment of the present invention will be described in detail with reference to the accompanying drawings.

FIGS. 4A to 4D are assembly views showing an assembly sequence of the hose connection part for a battery cooling system according to one embodiment of the present invention.

Figure 4A:
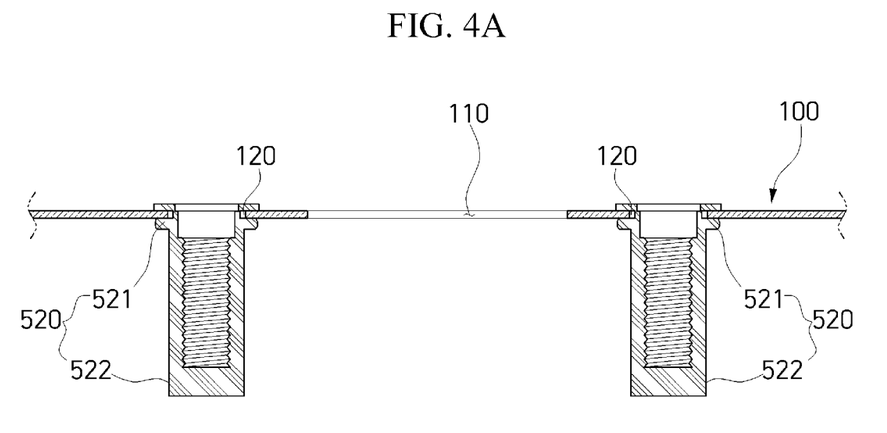
FIGS. 4A to 4D are examples of assembly views showing an assembly sequence of the hose connection part for a battery cooling system.

First, as illustrated in FIG. 4A, the housing, in which the battery pack and the cooling block are accommodated, is formed, and the upper case 100, which seals the upper portion of the battery pack and an upper portion of the cooling block, is disposed.

In the upper case 100, the first insertion hole 110, into which the hose connection part 200 is inserted, and the pair of coupling holes 120, which are disposed at both sides of the first insertion hole 110 to allow the hose connection part 200 to be coupled to the upper case 100, are formed.

In addition, the coupling part 520, into which the assembly bolt 510 of the fixing member 500 is inserted, of the fixing member 500 is coupled to each of the pair of the coupling holes 120.

Figure 4B:
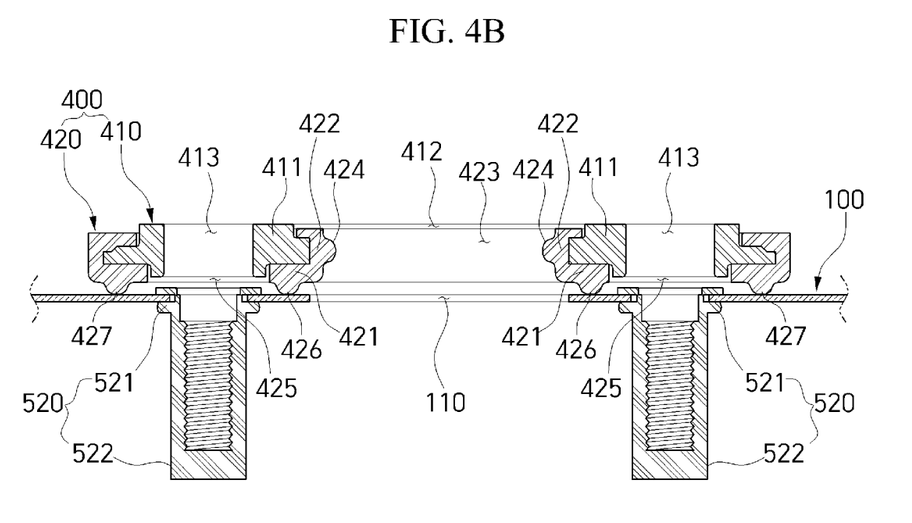

Then, as illustrated in FIG. 4B, the sealing member 400 including the bracket 410 and the gasket 420 is seated in a region, in which the first insertion hole 1110 is formed, in the upper case 100.

In this case, the second insertion hole 412 formed in the bracket 410 and the third insertion hole 423 formed in the gasket 420 are concentric with the first insertion hole 110 of the upper case 100, and the second through hole 413 formed in the bracket 410 and the third through hole 425 formed in the gasket 420 are concentric with the coupling hole 120 of the upper case 100.

Figure 4C:
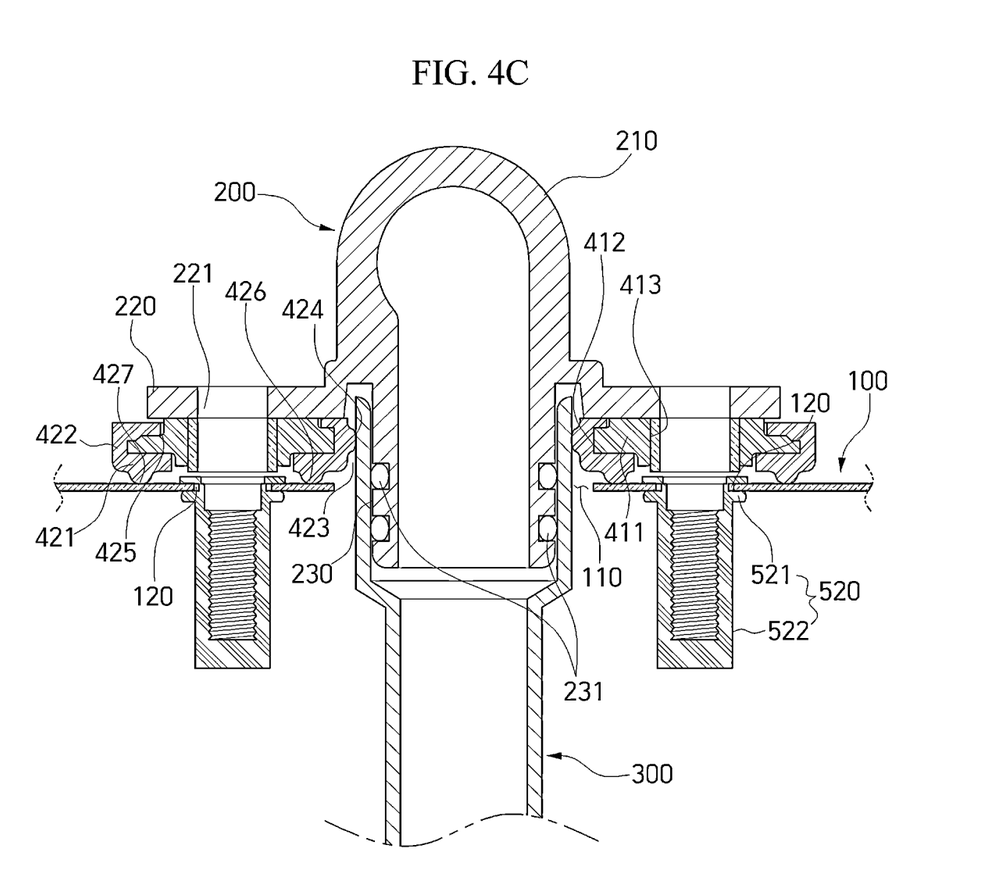

Then, as illustrated in FIG. 4C, the hose connection part 200, of which the insertion part 230 is coupled to the nipple 300, is disposed on the sealing member 400.

In this case, the insertion part 230 formed in the hose connection part 200 passes through from the first insertion hole 110 to the third insertion hole 423, and the first through hole 221 formed in the flange part 220 of the hose connection part 200 is concentric with the second through hole 413 and the third through hole 425.

In addition, the first lower protruding part 426 and the second lower protruding part 427 formed in a lower portion of the gasket 420 are in contact with an upper portion of the upper case 100.

Accordingly, the sealing member 400 is disposed between the upper case 100 and the flange part 220.

In addition, the protruding inner circumferential surface part 424 formed in the band shape on the inner circumferential surface of the third insertion hole 423 is in contact with the outer circumferential surface of the nipple 300.

Accordingly, cooling water introduced into the hose connection part 200 may be effectively blocked from leaking through the space between the insertion part 230 of the hose connection part 200 and the nipple 300.

Figure 4D:
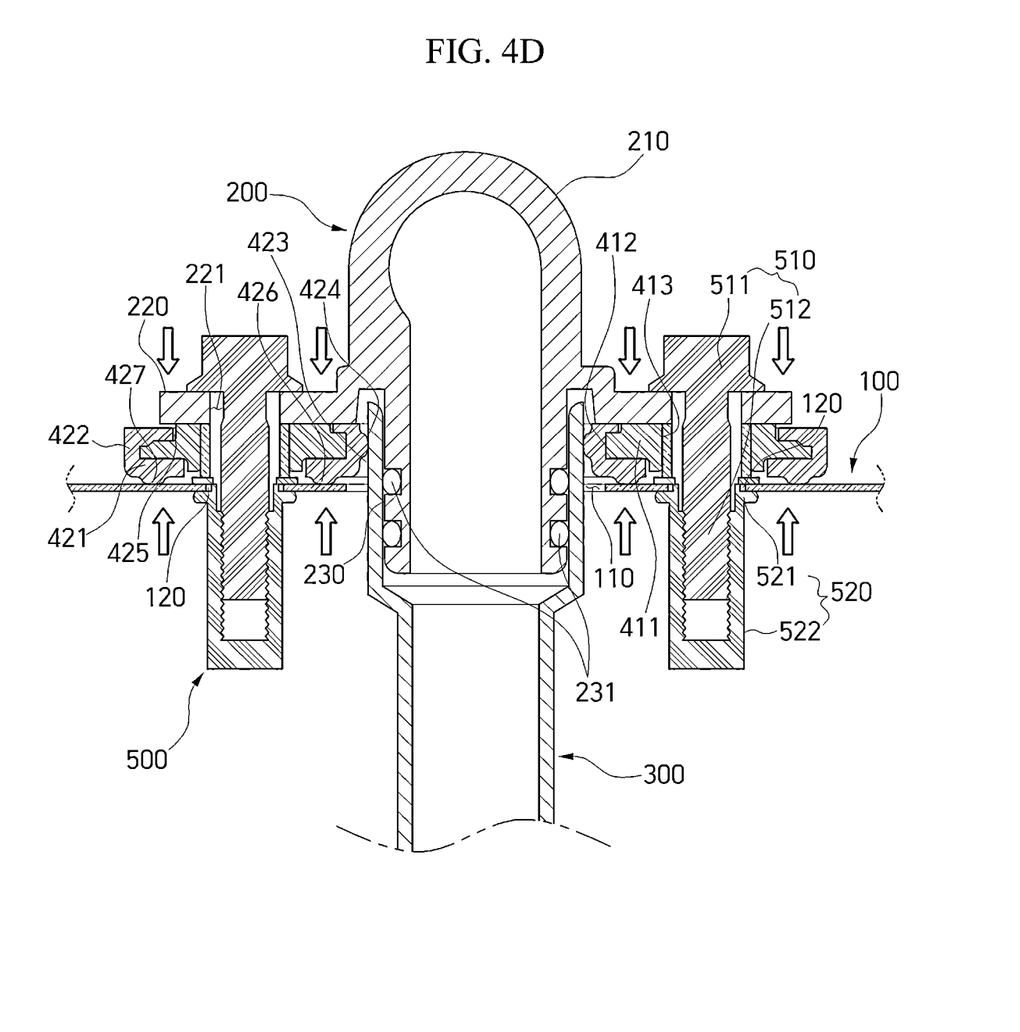

Then, as illustrated in FIG. 4D, the assembly bolt 510 of the fixing member 500 is inserted into the first through hole 221 to the third through hole 425 and the coupling hole 120.

In this case, the head part 511 of the assembly bolt 510 is hooked on the upper surface of the flange part 220 of the hose connection part 200, and the screw part 512 is coupled to the coupling groove 522 of the coupling part 520 in the screw-coupling manner.

Accordingly, since the head part 511 of the assembly bolt 510 presses the upper surface of the flange part 220 when the assembly bolt 510 coupled to the coupling groove 522 is tightened, the sealing member 400 disposed under the flange part 220 is pressed downward.

In addition, the upper case 100, to which the coupling part 520 is fixed, is pressed upward.

That is, the hose connection part 200 and the coupling part 520 are moved in facing directions when the assembly bolt 510 is tightened so that the sealing member 400 disposed between the hose connection part 200 and the upper case 100 may be effectively compressed.

Accordingly, even when the cooling water leaks through the space between the insertion part 230 of the hose connection part 200 and the nipple 300, since the space between the sealing member 400 and the upper case 100 is sealed by the first lower protruding part 426 and the second lower protruding part 427 of the sealing member 400, the cooling water may be effectively blocked from leaking to the outside of the hose connection part 200.

As described above, in the joint structure of the hose connection part 200 for a battery cooling system according to the present invention, since the upper surface of the bracket 410 is formed at a higher level than the upper surface of the gasket 420, that is, the upper surface of the extension part 422, and is in contact with the lower surface of the flange part 220, the bracket 410 may effectively block the cooling water leaking through the space between the hose connection part 200 and the nipple 300 from additionally leaking through the space between the flange part 220 and the upper case 100.

In addition, since the inner circumferential surface of the nipple 300 is in contact with the O-ring 231, and the outer circumferential surface of the nipple 300 is in contact with the protruding inner circumferential surface part 424, the protruding inner circumferential surface part 424 may effectively block the cooling water from leaking through the space between the nipple 300 and the sealing member 400, and thus, even when the cooling water leaks through the space between the insertion part 230 of the hose connection part 200 and the nipple 300 coupled to the hose connection part 200, the cooling water may be effectively blocked from leaking through the space between the outer circumferential surface of the nipple 300 and the third insertion hole 423.

In addition, the hose connection part 200 and the coupling part 520 are moved in the facing directions when the fixing member 500 is tightened so that the sealing member 400 disposed between the hose connection part 200 and the upper case 100 may be effectively compressed by the hose connection part 200 and the upper case 100.

In addition, even when the cooling water leaks through the space between the insertion part 230 of the hose connection part 200 and the nipple 300, since the space between the sealing member 400 and the upper case 100 is sealed by the first lower protruding part 426 and the second lower protruding part 427 of the sealing member 400, the cooling water may be effectively blocked from leaking to the outside of the hose connection part 200.

According to the present invention, since an upper surface of a bracket is formed at a higher level than an upper surface of a gasket, that is, an upper surface of an extension part, and the upper surface of the bracket is in contact with a lower surface of a flange part, there is an effect in that the bracket can effectively block cooling water leaking through a space between a hose connection part and a nipple from additionally leaking through a space between the flange part and an upper case.

In addition, since an inner circumferential surface of the nipple is in contact with an O-ring, and an outer circumferential surface of the nipple is in contact with a protruding inner circumferential surface part, the protruding inner circumferential surface part can effectively block the cooling water from leaking through a space between the nipple and a sealing member, and thus, there is an effect of effectively blocking the cooling water from leaking through a space between the outer circumferential surface of the nipple and a third insertion hole even when the cooling water leaks through a space between an insertion part of the hose connection part and the nipple coupled to the hose connection part.

In addition, since the hose connection part and the coupling part are moved in facing directions when a fixing member is tightened, there is an effect in that the sealing member disposed between the hose connection part and the upper case can be effectively compressed by the hose connection part and the upper case.

In addition, even when the cooling water leaks through a space between the insertion part of the hose connection part and the nipple, since a space between the sealing member and the upper case is sealed by a first lower protruding part and a second lower protruding part of the sealing member, there is an effect of blocking the cooling water from leaking to the outside of the hose connection part.

The foregoing description is directed to providing a hose connection joint structure for a battery cooling system which is capable of preventing a short circuit and fire between battery cells accommodated in a battery pack by preventing cooling water from being introduced into the battery pack.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A hose connection joint structure for a battery cooling system of a battery pack, the hose connection joint structure comprising:
    an upper case configured to seal an upper portion of the battery pack;
    a hose connection part disposed on an upper surface of the upper case and being configured to introduce cooling water from the outside; and
    a sealing member disposed between the upper case and the hose connection part,
    wherein the sealing member comprises:
        a bracket in contact with a lower surface of the hose connection part and being configured to block the cooling water from leaking from the lower surface of the hose connection part; and
        a gasket surrounding an outer circumference of the bracket and being in contact with the upper surface of the upper case to block the cooling water from leaking from the upper surface of the upper case.

2. The hose connection joint structure of claim 1, wherein:
    the upper case comprises:

a first insertion hole to allow an inner portion and an outer portion of the upper case to communicate with each other and into which the hose connection part is inserted; and
a pair of coupling holes formed at both sides of the first insertion hole; and
the hose connection part comprises:
a connection body part configured to be inserted into the first insertion hole and formed in a cylindrical shape and in which the cooling water from the outside flows;
a flange part formed in a rhombic shape when projected on a plane in a direction perpendicular to the connection body part and in which first through holes are formed at positions corresponding to the pair of coupling holes; and
an insertion part formed in a cylindrical shape, extending downward from a lower surface of the connection body part and passing through the first insertion hole.

3. The hose connection joint structure of claim 2, wherein:
an upper surface of the bracket is disposed higher than an upper surface of the gasket; and
a lower surface of the flange part being in contact with the upper surface of the bracket.

4. The hose connection joint structure of claim 2, wherein the bracket comprises:
a bracket body part;
a second insertion hole formed in the bracket body part at a position corresponding to the first insertion hole; and
second through holes formed in the bracket body part at positions corresponding to the pair of coupling holes and the first through holes.

5. The hose connection joint structure of claim 4, wherein the gasket comprises:
a gasket body part;
an extension part extending upward from a central portion of the gasket and being inserted into the second insertion hole;
a third insertion hole formed in the extension part at a position corresponding to the insertion part and in which the insertion part is inserted;
third through holes formed in the gasket body part at positions corresponding to the pair of coupling holes, the first through holes, and the second through holes;
a first lower protruding part protruding from a lower surface of the gasket body part and being concentric with the third insertion hole; and
a second lower protruding part protruding from the lower surface of the gasket body part at a position spaced outward from the first lower protruding part and being concentric with the third insertion hole and the first lower protruding part.

6. The hose connection joint structure of claim 5, further comprising a fixing member configured to pass through the coupling hole, the first through hole, the second through hole, and the third through hole to couple the hose connection part to the upper case.

7. The hose connection joint structure of claim 5, wherein:
the first lower protruding part is formed on the lower surface of the gasket body part between the third insertion hole and the third through holes; and
the second lower protruding part is formed on the lower surface of the gasket body part between the third through holes and a circumferential surface of the gasket body part.

8. The hose connection joint structure of claim 5, wherein the first lower protruding part and the second lower protruding part are in contact with the upper surface of the upper case.

9. A hose connection joint structure for a battery cooling system of a battery pack, the hose connection joint structure comprising:
an upper case configured to seal an upper portion of the battery pack;
a hose connection part disposed on an upper surface of the upper case and being configured to introduce cooling water from the outside;
a sealing member disposed between the upper case and the hose connection part; and
a nipple having one end coupled to a lower end of the hose connection part and another end coupled to a cooling block and being configured to allow the cooling water introduced from the hose connection part to be introduced into the cooling block,
the sealing member comprises a gasket comprising:
a gasket body part;
an extension part extending upward from a central portion of the gasket;
a third insertion hole formed in the extension part at a position corresponding to the hose connection part and into which the hose connection part is inserted; and
a protruding inner circumferential surface part protruding in a band shape along an inner circumferential surface of the third insertion hole.

10. The hose connection joint structure of claim 9, wherein a pair of O-rings, spaced apart from each other in a vertical direction, are coupled to an outer circumferential surface of the hose connection part.

11. The hose connection joint structure of claim 10, wherein the O-rings are in contact with an inner circumferential surface of the nipple; and the protruding inner circumferential surface part is in contact with an outer circumferential surface of the nipple.

12. A hose connection joint structure for a battery cooling system of a battery pack, the hose connection joint structure comprising:
an upper case comprising:
a first insertion hole configured to allow an inner portion and an outer portion of the upper case to communicate with each other; and
a pair of coupling holes formed at both sides of the first insertion hole to seal an upper portion of the battery pack;
a hose connection part is disposed on an upper surface of the upper case and being configured to introduce cooling water from the outside;
a sealing member disposed between the upper case and the hose connection part; and
a fixing member configured to fix the hose connection part to the upper case,
where the hose connection part comprises:
a connection body part inserted into the first insertion hole and formed in a cylindrical shape and in which the cooling water from the outside flows; and
a flange part formed in a rhombic shape when projected on a plane in a direction perpendicular to the connection body part and in which first through holes are formed at positions corresponding to the pair of coupling holes; and wherein the fixing member comprising assembly bolts that pass through the first through holes and are hooked on the flange part.

13. The hose connection joint structure of claim 12, wherein the hose connection part and the coupling part move towards each other, in response to the fixing member being tightened.

14. The hose connection joint structure of claim 12, wherein the assembly bolt comprises:
   a head part having a lower surface hooked on an upper surface of the flange part; and
   a screw part extending from the head part in a direction toward the coupling part and being coupled to the coupling part.

15. The hose connection joint structure of claim 14, wherein the coupling part comprises:
   a fixing part fixed to the coupling hole; and
   a coupling groove extending downward from the fixing part and being formed in a cylindrical shape and having an inner circumferential surface coupled to the screw part.

16. The hose connection joint structure of claim 12, wherein the fixing member comprises a coupling part fixed to the coupling hole and coupled to the assembly bolt in a screw-coupling manner.

\* \* \* \* \*